Patented Oct. 3, 1950

2,524,416

UNITED STATES PATENT OFFICE 2,524,416

MANUFACTURE OF TABLET JELLIES

George L. Baker, Newark, Del., and Mamie Olliver, Histon, Cambridge, England, assignors to Chivers & Sons Limited, Histon, Cambridge, England No Drawing. Application January 3, 1949, Serial No. 69,056. In Great Britain January 12, 1948

18 Claims. (Cl. 99—132)

This invention is concerned with improvements in and relating to the manufacture of tablet jellies, and its object is to provide an improved process for the manufacture of jellies in concentrated tablet or like form which can readily be made by the housewife into attractive table jellies.

At present tablet jellies are made from gelatine, agar, alginates and the like; gelatine jellies have the disadvantage of being slow setting on making up by the housewife, whilst agar and alginate jellies often lack clarity. Often storage of these jellies results in loss of gelling strength and consequent increase in time required for setting. Loss of gelling strength may also occur during making up, for example if a gelatine tablet jelly is boiled with water.

To overcome these disadvantages the use of low methyl pectin has been proposed, and has resulted in the production of jelly concentrates in powder or crystal form. Such pectin jellies are found to be quick setting as compared to gelatine jellies and do not appreciably lose gelling strength on storing or making up. The use of powders however requires more care in making up of the jelly and incorporation of liquid fruit juices in such powders is of course difficult.

We have now found that by partially dispersing low methyl pectin under controlled conditions, we are able to produce a satisfactory concentrated tablet jelly, thus incorporating the advantages of the prior known jelly concentrates and eliminating the disadvantages mentioned above. Tablet jellies produced in this may are clear, firm, easily cut and molded, lack stickiness, and may be readily converted by dilution into attractive and palatable table jellies.

According to the invention there is provided a process for the manufacture of tablet jellies in which low methyl pectin is partially dispersed in an aqueous solution of a suitable sweetening agent as herein defined, an edible acid and a soluble edible salt of a polyvalent metal by heating, the conditions of heating and the quantities of the constituents being so adjusted that the total soluble solids contents of the final tablet after cooling is within the range of from 68–80% by weight.

The term "low methyl pectin" as used herein means a pectin the methoxyl content of which is between 1–8.5% based on 100% calcium pectate.

Preferably the sieve size of the low methyl pectin should be adjusted to obtain the optimum rate of dispersion as is later described. In practice we have found that a low methyl pectin sample, 50% of which will pass through a 150 mesh sieve, and having a methoxyl content of between 4–6% is most suited for the process according to the invention.

The term "a suitable sweetening agent" as used herein means any sugar or polyhydric alcohol obtained by the reduction of a sugar, glycerine or an edible sugar-containing compound such for example as honey. Examples of preferred sweetening agents are sucrose and glucose.

As edible acids we may use any inorganic or organic acid which will be edible and non-injurious in the proportions used. At present we prefer to use either citric acid, malic acid, or tartaric acid.

As polyvalent metal salts we may use a salt of a polyvalent metal which is soluble in cold water and is edible and non-injurious in the proportions used; at present we prefer to use edible inorganic or organic salts of calcium e. g. calcium chloride.

The degree of dispersion of the pectin should be carefully controlled during manufacture of the tablet and in order to do this several factors must be taken into account. These factors are (1) rate of reaction of the polyvalent ion with the low methyl pectin, (2) particle size of the low methyl pectin, (3) temperature of reaction and (4) time of reaction. We prefer to allow the temperature of reaction to rise with boiling of the mixture. The rate of reaction of the polyvalent ion with the low methyl pectin depends, inter alia on the metal chosen, the particle size and methoxyl content of the low methyl pectin; these last variables must be adjusted together with the time of reaction to give the desired degree of dispersion.

The degree of dispersion of the low methyl pectin can be determined by means of microscopical examination and this method used as a means of controlling the conditions of manufacture. Incomplete dispersion shows itself in the presence of particles with the edges clearly defined; as dispersion proceeds the edges of these particles become more blurred until only some particles with blurred edges remain. These disappear at the stage of complete dispersion. It has been found that the optimum stage of dispersion is reached when some particles of low methyl pectin are still visible under the microscope but the edges are becoming blurred.

If the dispersion is not allowed to reach this stage, then a soft granular tablet results. If the optimum degree of dispersion is exceeded then the mix becomes extremely difficult to handle during manufacture.

In general we prefer to control the degree of dispersion by correctly adjusting the dilution of the low methyl pectin at the beginning of the process; it will be a simple matter to determine the optimum conditions of dilution for any given sample of low methyl pectin by carrying out a few preliminary tests.

The total soluble solids content of the final tablet gel must be adjusted to between 68–80% and this may be done by controlling the amount of water evaporated. The optimum total solids content is in general about 76%.

The pH of the jelly batch at the beginning of the process is adjusted by varying the quantity of the edible acid taken; in general we have found that the best pH for gelling requirements is that most suitable for flavour requirements; at present we prefer to adjust the pH to 3.4.

In order to prevent crystallisation of sugar in the finished tablet on storage we have found that it is desirable to add a quantity of invert syrup to the jelly batch at the beginning of the process.

The amount added must be varied according to the degree of inversion of the sugar during manufacture since too high a percentage of invert sugar in the finished tablet will also result in crystallisation during storage. Similarly, to simplify molding and improve the texture of the finished gel we have found that it may be desirable to add a quantity of glycerine to the batch.

According to a still further feature of the invention therefore the low methyl pectin mixture also contains a quantity of invert syrup and/or glycerine.

Various flavourings including fruit juices, true fruit esters and concentrates may if desired be added to the jelly mixture; we have found that fruit juices alone do not produce sufficient flavour and are apt to produce an insipid jelly; it is preferable therefore to use in addition to the fruit juices, a quantity of artificial flavouring. In order still more to improve the flavour, buffer salts such as sodium hydrogen phosphate may be added. Edible artificial colouring matters may also be added.

The making up into table jellies of the tablet jellies produced according to the present process forms no part of this invention; it should be stated however that this may be done by boiling with a quantity of water, and then allowing the solution to set.

It will be understood that tablet jellies produced according to the invention may be produced in any desired shape or configuration for example by the use of suitably designed moulds and the like.

In order that the invention may be well understood the following examples are given only as illustrations:

In both the following examples the methoxyl content of the low methyl pectin was 5.4% (based on 100% calcium pectate); 30% of this pectin was retained by a 100 mesh sieve, 35% would pass a 100 mesh sieve but was retained by one of 170 mesh, the remaining 35% passed the 170 mesh sieve.

*Example 1*

The ingredients used were as follows:

| | Grams |
|---|---|
| Low methyl pectin | 40 |
| Water | 360 |
| Cane sugar | 264 |
| Invert syrup (80% total soluble solids—inversion 40%) | 400 |
| Glycerine | 72 |
| Citric acid (added as 60% solution) | 9.6 |
| Calcium (added as a solution of calcium chloride containing 6 mg. calcium per ml.) | 0.192 |

The solid ingredients were mixed, and the mixed liquid ingredients were added with stirring. The mixture was rapidly brought to the boil, and rapidly boiled down to a weight of 920 grams, stirring being continued throughout. The mixture was then rapidly poured into moulds and allowed to set.

*Example 2*

The ingredients used were as follows:

| | Grams |
|---|---|
| Low methyl pectin | 40 |
| Water | 248 |
| Cane sugar | 496 |
| Invert syrup (63% total soluble solids inversion 80%) | 260 |
| Citric acid (added as a 60% solution) | 8 |
| Calcium (added as a solution of calcium chloride containing 6 mg. calcium per ml.) | 0.156 |
| Raspberry juice | 92 |
| Synthetic raspberry essence | 0.55 |
| Synthetic raspberry colour (added as a 1.5% solution) | 0.073 |

The ingredients were made up to a tablet jelly as described in Example 1.

We claim:

1. A concentrated pectin jelly composition in the form of a solid aqueous gel which will form a greater volume of an edible dessert jelly on dissolution in hot water followed by cooling, said gel comprising an aqueous partial dispersion of pectin the methoxyl content of which pectin is within the range of from 1–8.5% based on 100% calcium pectate, an edible acid, a water soluble edible salt of a polyvalent metal and a sweetening agent selected from the group consisting of sugars, polyhydric alcohols derived from sugars by reduction, glycerine and edible sugar-containing compounds, the soluble solids content of said gel being within the range of from 68–80% by weight.

2. A concentrated pectin jelly composition as claimed in claim 1 in which said polyvalent metal is calcium.

3. A concentrated pectin jelly composition as claimed in claim 1, in which the pectin has a methoxyl content within the range of from 4–6% and is of such size that 50% of it will pass through a 150 mesh sieve.

4. A concentrated pectin jelly composition in the form of a solid aqueous gel which will form a greater volume of an edible dessert jelly on dissolution in hot water followed by cooling, said gel comprising an aqueous partial dispersion of pectin, the methoxyl content of which pectin is within the range of from 4–6%, a water-soluble edible calcium salt, an edible organic acid, a sugar, the soluble solids content of said gel being within the range of from 68–70% by weight.

5. A concentrated pectin jelly composition as claimed in claim 4, the soluble solids content of which is about 76% by weight.

6. A concentrated pectin jelly composition as claimed in claim 4 also comprising a member selected from the group consisting of glycerine and invert syrup.

7. A concentrated pectin jelly composition as claimed in claim 4 also comprising a flavoring material selected from the group consisting of fruit juices, true fruit esters, fruit concentrates and artificial flavorings.

8. A concentrated pectin jelly composition as claimed in claim 4 also comprising an edible artificial coloring compound.

9. A concentrated pectin jelly composition as claimed in claim 4 also comprising an edible buffer salt.

10. A method of manufacturing a concentrated pectin jelly composition in the form of a solid aqueous gel which will form a greater volume of an edible dessert jelly on dissolution in hot water followed by cooling, said method comprising, partially dispersing by heat a solid pectin the methoxyl content of which is within the range of from 1–8.5% based on 100% calcium pectate, in an aqueous solution comprising an edible acid, a soluble edible salt of a polyvalent metal, and a sweetening agent selected from the group consisting of sugars, polyhydric alcohols derived by the reduction of sugars, glycerine and edible sugar-containing compounds, and cooling the resulting mixture so as to form a solid gel the soluble solids content of which is within the range of from 68–80% by weight.

11. A method as claimed in claim 10 in which said polyvalent metal is calcium.

12. A method as claimed in claim 10 in which the methoxyl content of the pectin is within the range of from 4–6% and is of such a size that 50% of it will pass a 150 mesh sieve.

13. A method as claimed in claim 10 in which the pH of said aqueous solution is adjusted to about 3–4 before the partial dispersion of the pectin therein.

14. A method as claimed in claim 10 in which a member of the group consisting of glycerine and invert sugar is added to said aqueous solution.

15. A method as claimed in claim 10, in which a flavoring material selected from the group consisting of fruit juices, true fruit esters, fruit concentrates, and artificial flavorings is added to the aqueous solution.

16. A method as claimed in claim 10 in which an edible artificial coloring compound is added to the aqueous solution.

17. A method as claimed in claim 10 in which an edible buffer salt is added to the aqueous solution.

18. A method of manufacturing a concentrated pectin jelly composition in the form of a solid aqueous gel which will form a greater volume of an edible dessert jelly on dissolution in hot water followed by cooling, said method comprising, partially dispersing by means of heat, a solid pectin the methoxyl content of which is within the range of from 4–6% in an aqueous solution comprising a soluble edible calcium salt, an edible organic acid and a sugar and cooling the resulting mixture to form a solid gel, the soluble solids content of which is within the range of from 68–80%.

GEORGE L. BAKER.
MAMIE OLLIVER.

REFERENCES CITED

The following references are of record in the file of this patent:

UNITED STATES PATENTS

| Number | Name | Date |
| --- | --- | --- |
| 1,842,768 | Rooker et al. | Jan. 26, 1932 |
| 1,847,356 | Northcutt | Mar. 1, 1932 |
| 1,879,697 | Loesch | Sept. 27, 1932 |
| 2,334,281 | Olsen et al. | Nov. 16, 1943 |